Figure 1:
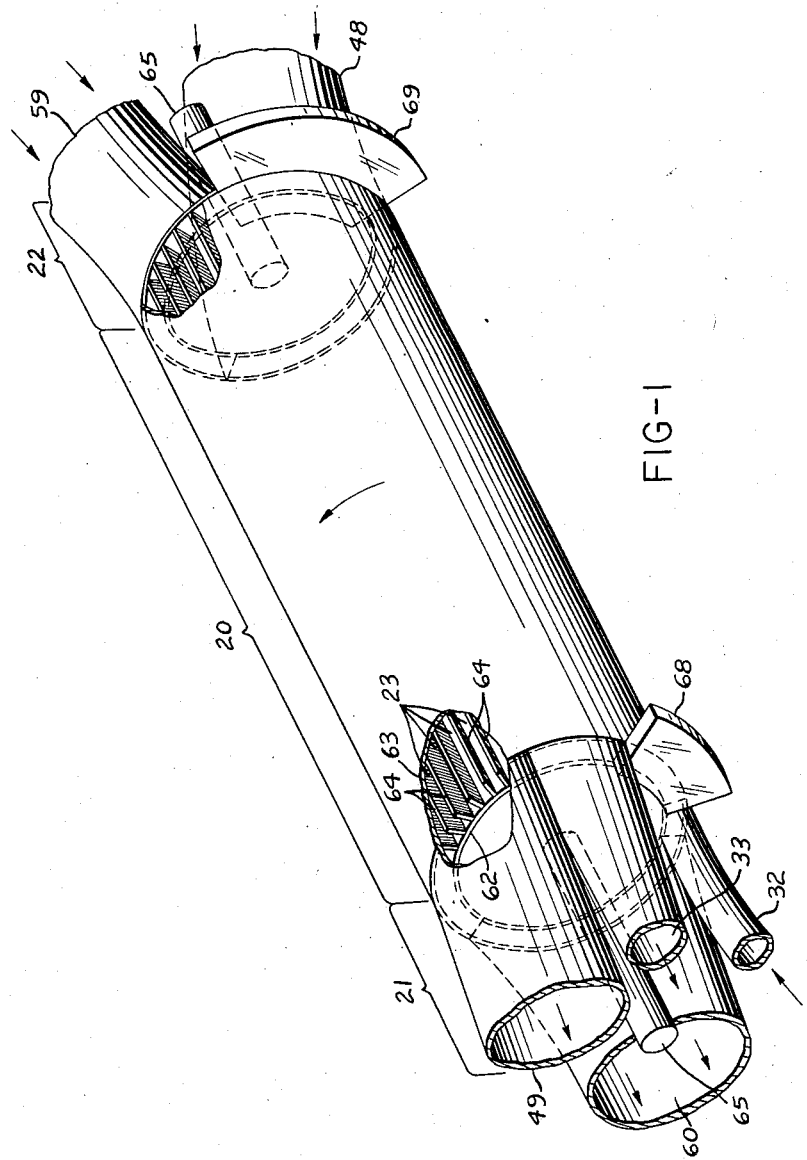

Sept. 1, 1959  H. S. GLICK ET AL  2,902,337
PROCESS FOR HEATING AND COOLING GASES AND APPARATUS THEREFOR
Filed Dec. 20, 1956  5 Sheets-Sheet 1

INVENTORS
HERBERT S. GLICK
ABRAHAM HERTZBERG
WILLIAM SQUIRE
ROGER WEATHERSTON
BY
ATTORNEY

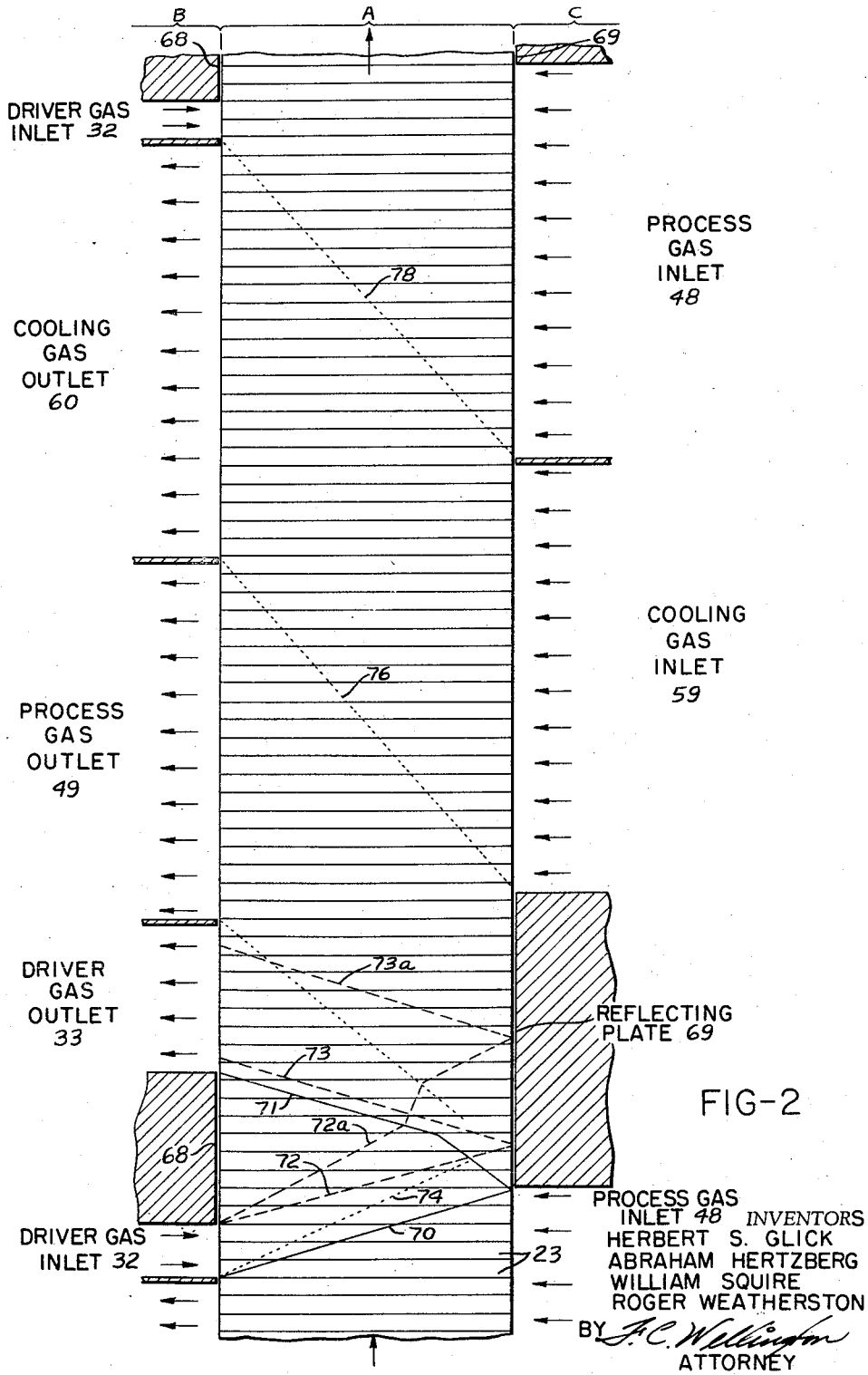

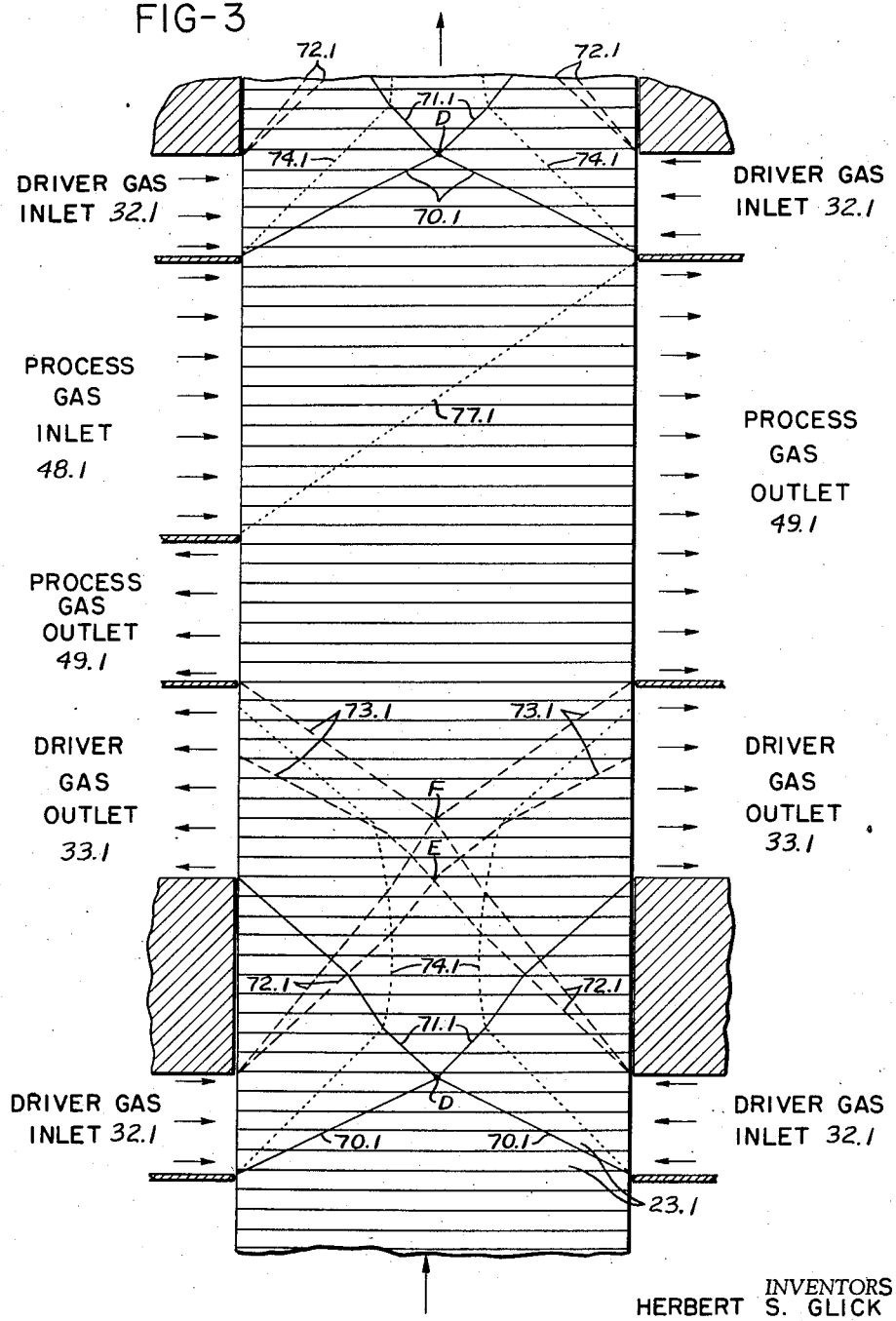

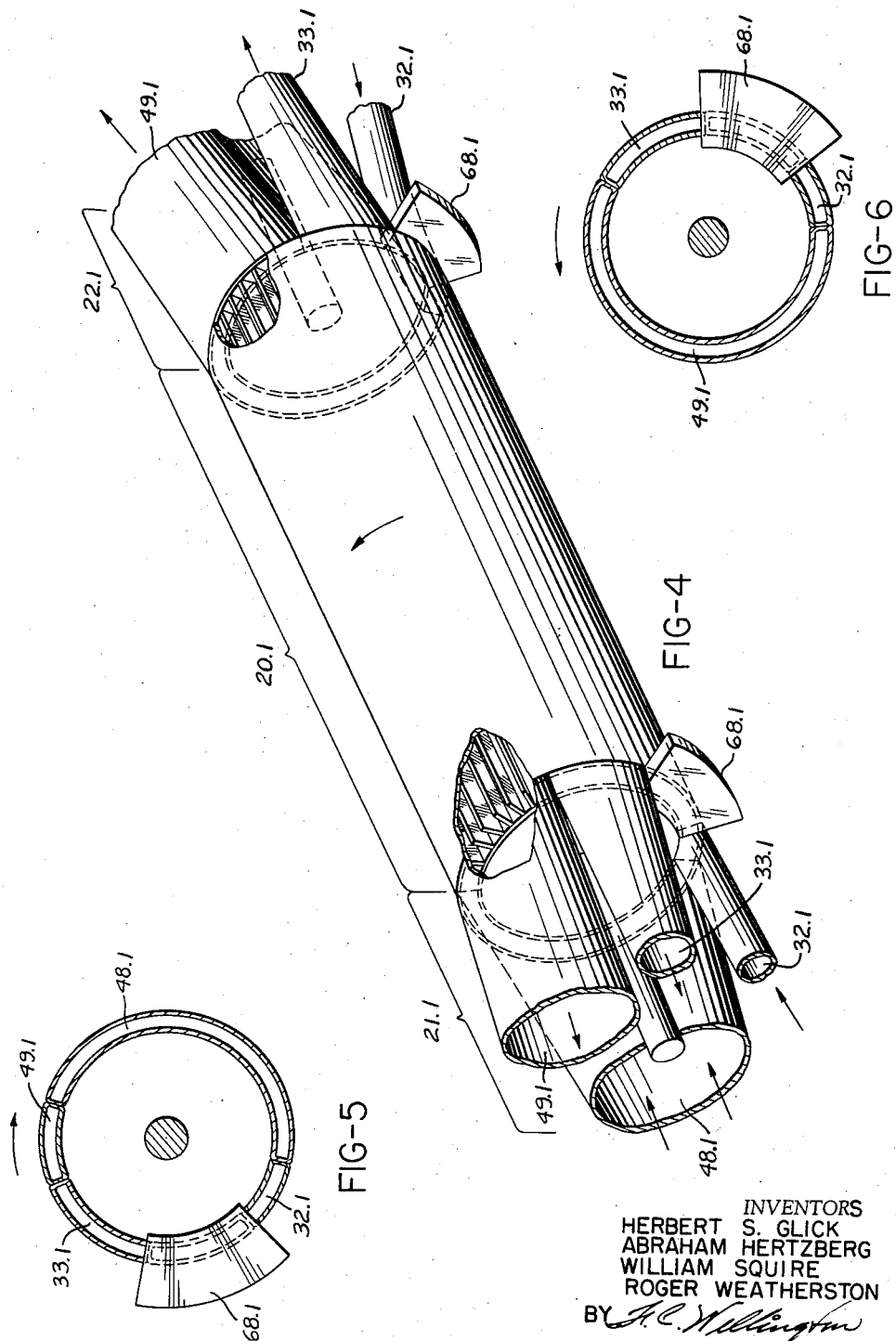

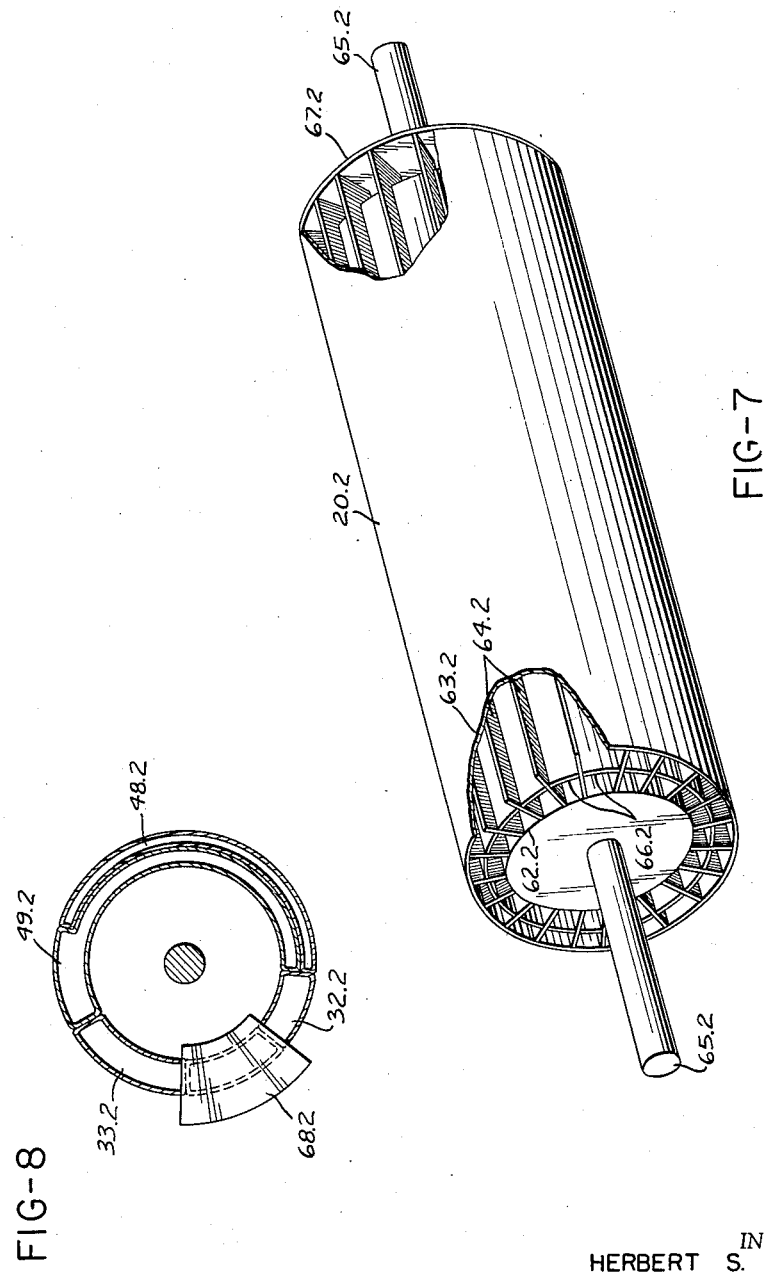

United States Patent Office 2,902,337
Patented Sept. 1, 1959

2,902,337

PROCESS FOR HEATING AND COOLING GASES AND APPARATUS THEREFOR

Herbert S. Glick, Eggertsville, Abraham Hertzberg and William Squire, Tonawanda, and Roger Weatherston, Williamsville, N.Y., assignors to Cornell Aeronautical Laboratory, Inc., Buffalo, N.Y., a corporation of New York Application December 20, 1956, Serial No. 629,525

4 Claims. (Cl. 23—1)

The present invention relates to methods and apparatus for rapidly heating and cooling gases. The invention is particularly applicable to chemical processes wherein reactions must be carried out at high temperatures to take advantage of equilibrium and/or rate factors, but which must be cooled to substantially lower temperatures very rapidly in order to freeze the reaction products in a non-equilibrium state and prevent adverse reequilibration during cooling.

In our earlier copending application Serial No. 477,222, filed December 23, 1954, now Patent No. 2,832,666, we describe and claim a process and apparatus for effecting the type of result described above. According to our earlier invention, a body of gas is first subjected to a shock wave which passes very rapidly through the gas and raises its pressure and temperature, and is then subjected to an expansion wave which passes rapidly through the gas and lowers both the pressure and temperature. A typical apparatus for carrying out the process of our earlier invention is illustrated herein in Figure I. A wave diagram schematically representing the operation of that apparatus is set forth herein as Figure II. Although these figures deal with our earlier invention, a brief discussion thereof is helpful in understanding the invention of the present application.

Figure I is a rotary reactor made up of a cylindrical member 20, rotatable on shaft 65, and two stationary members 21 and 22 positioned adjacent the ends of the rotatable cylindrical member. The rotatable cylinder 20 has a plurality of open-ended columns or tubes 23 positioned in a longitudinal direction around the periphery thereof. These columns are defined by concentric shells 62 and 63 and the plurality of partitions 64. When the apparatus is in operation, cylinder 20 is rotated at a relatively high rate of speed. As each of the columns 23 passes the process gas inlet 48, the gas to be subjected to the heating and cooling cycle passes into the column from the inlet. The opposite end of each column then passes inlet 32, through which a high pressure driver gas is introduced. The impact of the high pressure driver gas upon the process gas generates a shock wave which travels from left to right through the column of gas to plate 69 and is then reflected back toward the left end of the column. In the meantime, the left end of the column has gone beyond the driver gas inlet 32 and is adjacent to plate 68, whereby the flow of driver gas into the column is cut off. Cutting off the driver gas flow generates an expansion wave which follows the shock wave down through the column, and is also reflected off plate 69 back toward the left end of the column. The combined effect of the expansion wave and the reflected shock wave moves the driver gas back out of the column, which has now rotated adjacent to driver gas outlet 33. Removal of the driver gas allows the process gas to expand to its original volume in the column. Further rotation allows the process gas to flow out of the column through the process gas outlet 49. Complete evacuation of process gas from the columns is aided by introduction of a purge or scavenging gas through inlet 59. This purge gas can be a cooling gas, in which case it is in turn purged through cooling gas outlet 60 by a fresh charge of process gas introduced through process gas inlet 48. If a separate cooling gas is not necessary or desired, then the fresh process gas can be utilized as the purging gas—in which case the cooling gas inlet 59 and cooling gas outlet 60 can be dispensed with.

The sequence of the various steps described above, and the consequent flow of shock waves, expansion waves and gases through the reactor, can be illustrated schematically by the wave diagram of Figure II. In Figure II, A represents the development of a cylindrical plane passing through the center of each of the plurality of columns 23, B represents a development of the same plane passing through the stationary end 21 and C represents the development of the same plane through the stationary end 22.

The wave diagram of Figure II can be considered as representing the relative positions of shock and expansion wave fronts and gas phase interfaces within any single column as that column progresses through its cycle. Alternatively, the diagram can be considered as representing the relative positions of wave fronts and interfaces in all of the columns at a particular instant of time. For purposes of the immediately following discussion, the diagram will be considered in terms of the first alternative.

Referring to the wave diagram of Figure II, a driver gas is introduced through driver gas inlet 32 into a column of process gas 23. Introduction of the higher pressure driver gas generates a shock wave, which moves toward the right along line 70, and compresses the process gas. The interface separating the two gases moves to the right (but at a slower rate than the shock wave) along dotted line 74. By the time the shock wave has reached the right end of the column, the column has progressed to a position adjacent plate 69. The shock wave is reflected from plate 69 back toward the left end of the column along the line 71. When the left end of the column passed beyond the driver gas inlet 32 and adjacent to wall 68, the supply of high pressure driver gas was suddenly shut off, thereby generating an expansion wave fan indicated by the dashed lines 72 and 72a. This expansion wave passes through the column from left to right, first through the driver gas, then across the interface and through the process gas, cooling both gases as it passes therethrough. The expansion wave is reflected from plate 69 back toward the left end of the column along the path indicated between lines 73 and 73a.

By the time the reflected shock wave (line 71) has returned to the left end of the column, the column has progressed to a position adjacent driver gas outlet 33. Thus, the reflected shock wave passes out of the column without further reflection back into the column. The combined effects of the expansion wave and reflected shock wave tends to reverse the rightward flow of driver gas and push it back toward the left end of the column, where it is removed through driver gas outlet 33. As indicated by the interface line 74, all of the driver gas has been expelled from the column by the time the column has passed outlet 33—thereby allowing the process gas to expand to the original volume of the column. The process gas continues to expand and is taken from the column through process gas outlet 49. Removal of process gas is aided by introduction of cooling gas through the cooling gas inlet 59. The interface separating the cooling gas and the process gas travels through the column as indicated by line 76. The cooling gas is removed through the cooling gas outlet 60. Residual cooling gas is removed from the column by introduction of fresh process gas through process gas inlet 48. As indicated by the interface line 78, the column is completely cleared of cooling gas and charged with fresh process gas by the time the column arrives adjacent the driver gas inlet 32—thereby completing the cycle.

It will be noted that the highest temperatures and pressures occur at the right ends of the columns, where the shock waves are reflected from plate 69. These temperatures and pressures may very easily reach 5000° F. and 1000 p.s.i. Since the reflecting plate 69 is stationary and the columns are moving, there must be some sort of a seal provided between the stationary plate and the columns in order to minimize leakage of the process gas. Because of the high temperatures and pressures, such a seal presents a very difficult problem. The problem is made even more difficult because of the very high velocity (e.g., as high as 600 f.p.s.) at which the periphery of the cylinder moves past the reflecting plate.

It is an object of the present invention to provide an improvement upon the above-described process, which improvement will, inter alia, eliminate the need for a seal at the region where the highest temperatures and pressures occur in an apparatus such as discussed above.

This object is accomplished by generating the shock (heating) and expansion (cooling) waves as opposing pairs from opposite ends of a column of process gas, so that each pair of waves comes together in an intermediate or central section of the column. When two such waves come together, the effect is substantially the same as though there were a solid reflecting barrier at the plane of impact. Thus, by simultaneous introduction of opposing pairs of waves from opposite ends of the column, the region of highest temperature and pressure occurs in the central portion of the process gas column and not at an end which must be sealed against a reflecting plate.

The application and utilization of the above concept in the present invention is illustrated by the wave diagram of Figure III. As shown in Figure III, pressurized driver gas is simultaneously introduced through driver gas inlets 32.1 into opposite ends of a column 23.1 containing a gas to be processed. Introduction of this pressurized driver gas generates a symmetrical pair of primary shock waves (lines 70.1), which come together in the center of the column at point D, and then leave as reflected shock waves indicated by lines 71.1. Introduction of the high pressure driver gas compresses the process gas as indicated by the dotted interface lines 74.1. As the column passes beyond the driver gas inlets 32.1, the driver gas supply is cut off—thereby generating a symmetrical pair of expansion wave fans 72.1. These expansion fans pass through the driver gas, cross the interface separating the driver gas and process gas, and then pass through the process gas to come together in the center of the column (points E and F). They then leave the center of the column traveling toward opposite ends of the column as indicated by lines 73.1.

By the time the reflected shock waves have reached the opposite ends of the column, the column has moved adjacent to driver gas outlets 33.1, so that said reflected shock waves travel on out of the column without further reflection back into said column. The combined effects of the expansion waves traveling through the driver gas toward the process gas and the shock waves traveling from the process gas back through the driver gas forces the spent driver gas out through driver gas outlets 33.1. By the time the spent driver gas has been exhausted from the columns, as indicated by interface lines 74.1, the column has moved to a position in line with process gas outlets 49.1, into which process gas passes by further expansion. The process gas remaining in the column is then scavenged by fresh process gas introduced through process gas inlet 48.1. By the time the fresh process gas has completely removed the original process gas (as indicated by interface line 77.1), the column has progressed to a position in line with the driver gas inlets 32.1, thereby completing the cycle.

A typical apparatus for carrying out the process schematically diagrammed in Figure III is illustrated in Figure IV. The reactor of Figure IV is similar to that of Figure I in having a rotatable member 20.1 and two stationary end members 21.1 and 22.1, through which the various gas streams are introduced to and withdrawn from the rotatable member.

As is apparent from the foregoing Figure III, the reactor of Figure IV is operated by simultaneous introduction of pressurized driver gas through both driver gas inlets 32.1, simultaneous withdrawal of spent driver gas through both driver gas outlets 33.1, withdrawal of treated process gas through process gas outlets 49.1, scavenging of treated process gas from the reactor and recharging of the reactor for the next cycle by introduction of fresh process gas through process gas inlet 48.1.

In order to better illustrate the arrangement and relative positions of the various inlets and outlets which constitute the stationary ends of the above-described reactor, Figures V and VI are presented. These figures represent vertical transverse views of the left stationary end and right stationary end, respectively, each viewed from the direction of the rotatable portion of the reactor. The direction of rotation of the rotatable section of the reactor with respect to the stationary ends is indicated by the arrow in each of Figures V and VI.

In Figures V and VI, the areas 32.1 represent the openings through which driver gas is introduced. The areas 68.1 represent the plates which close the ends of the columns while the primary shock waves pass through the columns. The areas 33.1 represent the exits through which processed gas is withdrawn from the columns. Area 48.1 represents the opening through which fresh process gas is introduced into the columns.

It should be understood that there are numerous alternatives to or variations of the above-described apparatus and process which can be utilized without departing from the basic invention disclosed herein. A few of these variations are mentioned below; numerous others will be apparent to those skilled in the art.

For example, as was indicated earlier, the processed gases can be purged or scavenged from the reactor either by direct addition of new process gas or by intermediate use of a separate gas—which can also serve to cool the reactor between cycles. The use of a cooling gas is, of course, not the only way to control the temperature of the reactor. Other ways include control of temperature of one or both inlet gases (process gas or driver gas), or by external cooling (e.g., liquid or gaseous) of the reactor itself.

Most of the preceding description has dealt with the use of shock waves and expansion waves in columns which lie in straight lines. It is not necessary, however, that these columns be straight; nor is it necessary that the columns have any particular cross section, or even a uniform cross section. For example, the columns can be circular, oblong, square, rectangular, trapezoidal, arcuate, etc. Likewise, the columns can be either straight or curved, e.g., circular, helical or the like. A particular example of a non-linear tube having certain advantages over a straight tube or column is one which is bent double to form a U-shaped, or hairpin-shaped, column in which the two open ends are adjacent to each other.

A reactor utilizing this type of column is illustrated in the drawing of Figure VII. It will be noted that in Figure VII, the columns are arranged similarly to those in the earlier-described Figures I and IV in that there are a plurality of identical columns arranged longitudinally around the periphery of a rotatable cylindrical member. However, the columns in Figure VII differ from those in the earlier drawings in that each column is bent back on itself through 180°, so that the two ends thereof are adjacent to each other. In Figure VII the rotor 20.2, rotatable about the axle member 65.2, is made up of concentric cylindrical shells 62.2 and 63.2. The annular space between the cylindrical shells is closed on one end by plate 67.2 and is divided into a plurality of sectors by the radial planes 64.2 placed longitudinally between the cylindrical shells. Each sector contains a partial divider 66.2 placed approximately midway between and concentric with shells 62.2 and 63.2. The dividers 66.2 are terminated short of the right hand end of the member 20.2, thus dividing each sector into inner and outer zones communicating with each other through the opening between the plate 67.2 and the end of divider 66.2 to form a U-shaped column or tube. The use of this type of column allows all of the gases to be introduced and withdrawn from the columns at one end of the rotor, thereby making it unnecessary to have a tight-fitting, accurately designed stationary member at one end of the rotor.

A single stationary member to be utilized in conjunction with the U-shaped columns of Figure VII will be slightly different from those used with straight columns. A vertical transverse view of a suitable stationary member containing appropriate inlet and outlet openings for use with the rotor of Figure VII is illustrated in Figure VIII, viewed from the direction of the rotating member of the reactor. In Figure VIII, the opening 32.2 represents the inlet through which driver gas flows into both ends of the column of process gas. The area 68.2 represents the plates which cover both ends of the column while the shock waves travel through the gases in the column and return to the open ends thereof. The area 33.2 represents the opening through which the spent driver gas is withdrawn from the rotating columns. The area 49.2 represents the opening through which processed gas is withdrawn from the rotating columns. The area 48.2 represents the inlet through which new process gas is introduced into one end of each column in preparation for the beginning of a new cycle.

Although each of the above-described embodiments has involved an arrangement of columns of tubes positioned longitudinally around the periphery of a cylinder, the columns need not be arranged in this manner—nor need there even be a plurality of columns. For example, the tube or column may be located as a diameter or minor chord of a circle, with the various inlet and outlet openings spaced around the circumference of the circle.

As indicated earlier, the present invention is applicable generally to any process involving rapid heating and cooling of gases, but is particularly useful in carrying out gas-phase chemical reactions where high temperatures and extremely rapid cooling rates are desirable. Examples of such reactions are the formation of acetylene from methane, ethane or ethylene, formation of nitric oxide from nitrogen and oxygen, thermal dissociation of water vapor to hydrogen and oxygen, thermal dissociation of carbon dioxide into carbon monoxide and oxygen, and many others. It can also be used for carrying out heterogeneous phase reactions, as between gases and solids. As an example of such a reaction there is mentioned the nitriding of metals—where the present invention could be used to obtain desirably high gas temperatures, but under conditions which would not cause appreciable heating of the metal surface being treated.

The selection of process conditions as well as the design and operation of an apparatus for carrying out the process will depend upon the particular temperature cycle selected for processing a particular gas. The maximum temperature attained by the process gas will depend upon the initial temperature of that gas and upon the Mach number of the primary shock waves. This maximum temperature will be attained only in that portion of the process gas which has been traversed both by the primary shock waves and the reflected shock waves before the arrival of an expansion wave front. The expansion waves will cool the gases very rapidly (e.g., on the order of millions of ° C. per second), so that the time of arrival of the expansion wave front limits the duration of the maximum temperature.

The velocities of the shock and expansion waves in a particular gas under any particular conditions of pressure and temperature can be calculated from known relationships between the foregoing factors and various gas properties such as density, specific heat, etc. Alternatively, these velocities can be determined experimentally. Under normal circumstances the expansion wave fronts will travel faster than the shock waves. Thus, particular care must be taken to avoid having the pair of expansion waves follow so closely behind the pair of shock waves that the expansion waves overtake and attenuate the shock waves before the latter have come together and heated the process gas to the desired maximum temperature. In most cases it will be preferable to delay the expansion waves sufficiently that they do not pass into the process gas until the reflected shock waves have passed out of that gas—otherwise only a portion of the process gas will have been heated to the desired maximum temperature.

It should be realized that insofar as the temperature cycle of the process gas is concerned, it is immaterial how the shock and expansion waves are generated. Thus, these waves could be generated by mechanical means (e.g., a piston) as well as by the high pressure driver gases described above. However, the additional requirements relative to removal of the reflected shock waves from the gas column without further reflection back into the column, makes the use of mechanical wave generating means very difficult. Consequently, the use of driver gases for the purposes of this invention constitute a preferred embodiment thereof.

Suitable driver gases are preferably, though not necessarily, ones which will not react with the gases being processed, or the resulting products, ones which can be readily heated and/or compressed to the desired temperatures and pressures without decomposition or condensation and ones which have relatively low molecular weights. Examples of typical gases suitable under most circumstances are hydrogen, monatonic gases such as helium and argon, and other inert gases such as nitrogen. Under many circumstances, steam is suitable. Under some circumstances, the driver gas and process gas can be the same chemically, but differ from each other in temperature and/or pressure, etc. Shock waves can also be generated in the process gas itself as, for example, by effecting an abrupt change in its velocity. In such a case no driver gas of any type would be required.

The following is presented as an illustrative example of a set of specific conditions for effecting the type of result discussed in the foregoing specification:

*Example*

A U-shaped column six feet long (three feet per leg) is filled with air at one atmosphere and 1600° F. Steam at 600 p.s.i. and 1500° F. is introduced simultaneously into both ends of the tube and is abruptly cut off after 0.0006 second. Thereafter the ends of the column are left open to allow the reflected shock waves and steam to pass out of the column. This treatment causes the air to be compressed to 480 p.s.i. and heated to about 5100° F., and then cooled very rapidly. The initial cooling rate is about 2,000,000° F. per second, although this rate falls off somewhat as the gas becomes colder. The average elapsed time during which the air remains at the 5100° F. temperature is about 0.0005 second. After this time/temperature cycle, the air is found to contain about 4% by volume of nitric oxide.

We claim:

1. A method for rapidly heating and cooling a confined column of gas, which method comprises: (a) simultaneously introducing a pair of shock waves into opposite ends of said column, which shock waves come together at an intermediate section of said confined column and then leave said intermediate section, traveling toward opposite ends of said column; (b) subsequently (to introducing said shock waves) introducing a pair of expansion waves into opposite ends of said column, said expansion waves being introduced sufficiently later than said shock waves that said expansion waves do not overtake said shock waves before said shock waves have come together at the intermediate section of said confined column; and (c) allowing said shock waves to leave the opposite ends of said column without reflection back into said column.

2. A method for carrying out a gas-phase reaction involving sequential rapid heating and rapid cooling of a gaseous reaction mass, which method comprises: (a) simultaneously introducing pulses of pressurized driver gas into opposite ends of a confined column of said gaseous reaction mass, thereby generating a pair of shock waves which come together at an intermediate section of said column and then leave said intermediate section, moving toward opposite ends of said column; (b) subsequently (to introducing said pulses of pressurized driver gas) introducing a pair of expansion of waves into opposite ends of said column, said expansion waves being introduced sufficiently later than said shock waves that said expansion waves do not overtake said shock waves before the shock waves have come together at the intermediate section of said column; and (c) allowing said shock waves to leave the opposite ends of said column without reflection back into said column.

3. A method for carrying out a gas-phase reaction involving sequential rapid heating and rapid cooling of a gaseous reaction mass, which method comprises: (a) simultaneously flowing pressurized driver gas into opposite ends of a confined column of said gaseous reaction mass, thereby compressing said reaction mass and generating a pair of shock waves which come together at an intermediate section of said column and then leave said intermediate section, moving toward opposite ends of said column; (b) interrupting the flow of pressurized driver gas into said column, thereby generating a pair of expansion waves which move toward the intermediate section of said column and which, in conjunction with the aforesaid shock waves moving away from said intermediate section, tend to move said driver gas back out of said confined column and allow the aforesaid gaseous reaction mass to return to its original volume, said interruption of driver gas flow being delayed sufficiently that said expansion waves do not overtake said shock waves before the shock waves have come together at the intermediate section of said column; (c) allowing said driver gas to flow out of said confined column and allowing said shock waves to leave the opposite ends of said column without reflection back into said column; and (d) introducing a new gaseous mass into one end of said confined column to purge the aforesaid gaseous reaction mass from said column.

4. An apparatus for continuously carrying out a gas phase reaction involving sequential rapid heating and rapid cooling of a gaseous reaction mass which comprises a cylindrical reactor rotatable about its axis of symmetry and having a plurality of longitudinally located tubular members arranged about the periphery thereof, a reactant gas inlet positioned at one end of said reactor, a pair of driver gas inlets located at opposite ends of said reactor and in a line parallel to the axis of rotation of said reactor, a pair of driver gas outlets located at opposite ends of said reactor and in a line parallel to the axis of rotation of said reactor, and a reaction gas product gas outlet located at at least one end of said reactor, said inlets and outlets being adapted to be traversed by the ends of said tubular members during rotation of said reactor, and being arranged to be traversed in the sequence named herein.

References Cited in the file of this patent
UNITED STATES PATENTS

| | | |
|---|---|---|
| 2,690,960 | Kistiakowsky | Oct. 5, 1954 |
| 2,745,861 | Bondine | May 15, 1956 |

FOREIGN PATENTS

| | | |
|---|---|---|
| 737,555 | Great Britain | Sept. 28, 1955 |